(12) United States Patent
Nakamaru et al.

(10) Patent No.: US 11,773,938 B2
(45) Date of Patent: Oct. 3, 2023

(54) LIQUID SEALED DAMPER FOR OPENING AND CLOSING MEMBER

(71) Applicants: YAMASHITA RUBBER CO., LTD., Fujimino (JP); HONDA MOTOR CO., LTD., Tokyo (JP)

(72) Inventors: Yuichi Nakamaru, Saitama (JP); Hideyuki Koguchi, Saitama (JP); Yasunobu Kurota, Tokyo (JP); Takashi Kondo, Saitama (JP); Hideki Matsuoka, Tokyo (JP)

(73) Assignees: YAMASHITA RUBBER CO., LTD., Fujimino (JP); HONDA MOTOR CO., LTD., Tokyo (JP)

(*) Notice: Subject to any disclaimer, the term of this patent is extended or adjusted under 35 U.S.C. 154(b) by 120 days.

(21) Appl. No.: 17/507,230

(22) Filed: Oct. 21, 2021

(65) Prior Publication Data
US 2022/0128112 A1 Apr. 28, 2022

(30) Foreign Application Priority Data
Oct. 26, 2020 (JP) ................................ 2020-179015

(51) Int. Cl.
*F16F 7/10* (2006.01)
*E05F 5/02* (2006.01)
*F16F 15/023* (2006.01)

(52) U.S. Cl.
CPC ............ *F16F 7/1034* (2013.01); *E05F 5/025* (2013.01); *F16F 15/023* (2013.01); *E05Y 2201/212* (2013.01); *E05Y 2900/546* (2013.01); *F16F 2224/04* (2013.01); *F16F 2238/04* (2013.01)

(58) Field of Classification Search
CPC .............. F16F 2238/004; F16F 15/023; F16F 2224/04; F16F 7/1034
See application file for complete search history.

(56) References Cited

U.S. PATENT DOCUMENTS 8,454,002 B2 * 6/2013 Nishi .................... F16F 13/107
267/140.13
2012/0074629 A1 * 3/2012 Yamamoto ............ F16F 13/106
267/140.13

(Continued)

FOREIGN PATENT DOCUMENTS

JP 2000-085363 3/2000

*Primary Examiner* — Melanie Torres Williams
(74) *Attorney, Agent, or Firm* — Rankin, Hill & Clark LLP (57) ABSTRACT

A liquid sealed damper includes: an attachment portion attached to a peripheral portion of an opening of a vehicle or an opening and closing member for covering the opening; a contact portion to which an external force is input; an insulator configured to isolate vibration and connect the attachment portion and the contact portion; a main liquid chamber in which working liquid is sealed; an auxiliary liquid chamber having a wall portion formed of a diaphragm; and an orifice passage formed in the partition member and communicating with the main liquid chamber and the auxiliary liquid chamber. The partition member has a substantially circular surface forming a wall portion of the main liquid chamber. An opening portion at one end of the orifice passage is formed in the circular surface. The opening portion is formed to extend from an outer edge portion to a central portion of the circular surface.

19 Claims, 10 Drawing Sheets

(56) References Cited

U.S. PATENT DOCUMENTS

2015/0337919 A1* 11/2015 Kojima ................ F16F 13/106
　　　　　　　　　　　　　　　　　　　　267/140.13
2016/0053845 A1* 2/2016 Ueki .................... B60K 5/1208
　　　　　　　　　　　　　　　　　　　　267/140.13

* cited by examiner

LIQUID SEALED DAMPER FOR OPENING AND CLOSING MEMBER

CROSS-REFERENCE TO RELATED APPLICATION

This application claims the benefit of foreign priority to Japanese Patent Application No. 2020-179015, filed on Oct. 26, 2020, which is incorporated by reference in its entirety.

TECHNICAL FIELD

The present invention relates to a liquid sealed damper for an opening and closing member.

BACKGROUND ART

In general, a vehicle such as an automobile in which a luggage space is disposed at the rear side thereof includes a tail gate. The tail gate is rotatably provided at an opening of the luggage space. In such a vehicle, a tail gate damper is provided as a damper for an opening and closing member, in an opposite position between the opening of the luggage space and the tail gate, so that an impact generated, for example, by closing the tail gate, is suppressed by the tail gate damper (see, for example, JP 2000-85363 A).

The conventional tail gate damper has a simple structure using an elastic member made of rubber, and an impact is absorbed and thus suppressed by the rubber-made elastic member. However, a tail gate damper of a liquid sealed type has not been known in the art.

To provide a liquid sealed structure, it is necessary for the tail gate damper to include an insulator, a main liquid chamber in which working liquid is sealed, an auxiliary liquid chamber divided from the main liquid chamber by a partition member, and a diaphragm partly covering a wall portion of the auxiliary liquid chamber. Further, the partition member includes an orifice passage through which the main liquid chamber and the auxiliary liquid chamber are in communication with each other.

However, because the tail gate damper is disposed in a limited space of the rear luggage space or the tail gate, it is necessary to reduce the size of the tail gate damper. It is therefore difficult to provide a tail gate damper of the liquid sealed type having the above-described configuration.

Especially, if an opening portion of the orifice passage is enlarged to ensure a sufficient flowability, the partition member is upsized and thus the tail gate damper is upsized accordingly.

In view of the above, it is an object of the present invention to provide a liquid sealed damper for an opening and closing member, which can solve the above problem and which has a novel structure, and further which can reduce the size thereof while ensuring an adequate size of the opening portion of the orifice passage.

SUMMARY

To address the above problem, one aspect of the present invention provides a liquid sealed damper for an opening and closing member comprising: an attachment portion attached to one of a peripheral portion of an opening of a vehicle and an opening and closing member for covering the opening; a contact portion to which an external force is input from the other one of the peripheral portion of the opening and the opening and closing member; an insulator configured to isolate vibration and to connect the attachment portion and the contact portion; a main liquid chamber in which working liquid is sealed, the insulator serving as a wall portion of the main liquid chamber; an auxiliary liquid chamber divided from the main liquid chamber by a partition member, the auxiliary liquid chamber having a wall portion formed of a diaphragm; and an orifice passage formed in the partition member and communicating with the main liquid chamber and with the auxiliary liquid chamber. The partition member has a substantially circular surface that forms a wall portion of the main liquid chamber. An opening portion at one end of the orifice passage is formed in the circular surface. The opening portion is formed to extend from an outer edge portion to a central portion of the circular surface.

According to the liquid sealed damper for an opening and closing member configured as described above, since the opening portion of the orifice passage that faces the main liquid chamber is formed to extend from the outer edge portion to the central portion of the circular surface of the partition member, the size of the liquid sealed damper can be reduced while ensuring an adequate size of the opening portion of the orifice passage.

BRIEF DESCRIPTION OF THE DRAWINGS

The drawings described herein are for illustration purposes only and are not intended to limit the scope of the present invention in any way.

DETAILED DESCRIPTION

One embodiment of the present invention will be described in detail with reference to the accompanying drawings where appropriate. In the following description, front and rear directions, right and left directions, and upper and lower directions refer to corresponding directions shown in FIG. 1. The following embodiment illustrates an example in which a liquid sealed damper 1 for an opening and closing member is attached to a tail gate that is provided in a vehicle such as an automobile. However, it is not intended to limit the application of the liquid sealed damper to be installed in any specific location, and the liquid sealed damper may be applied to an opening of another type of vehicle, and an opening and closing member for covering an opening of a vehicle, such as a bonnet and a side door.

Figure 1:
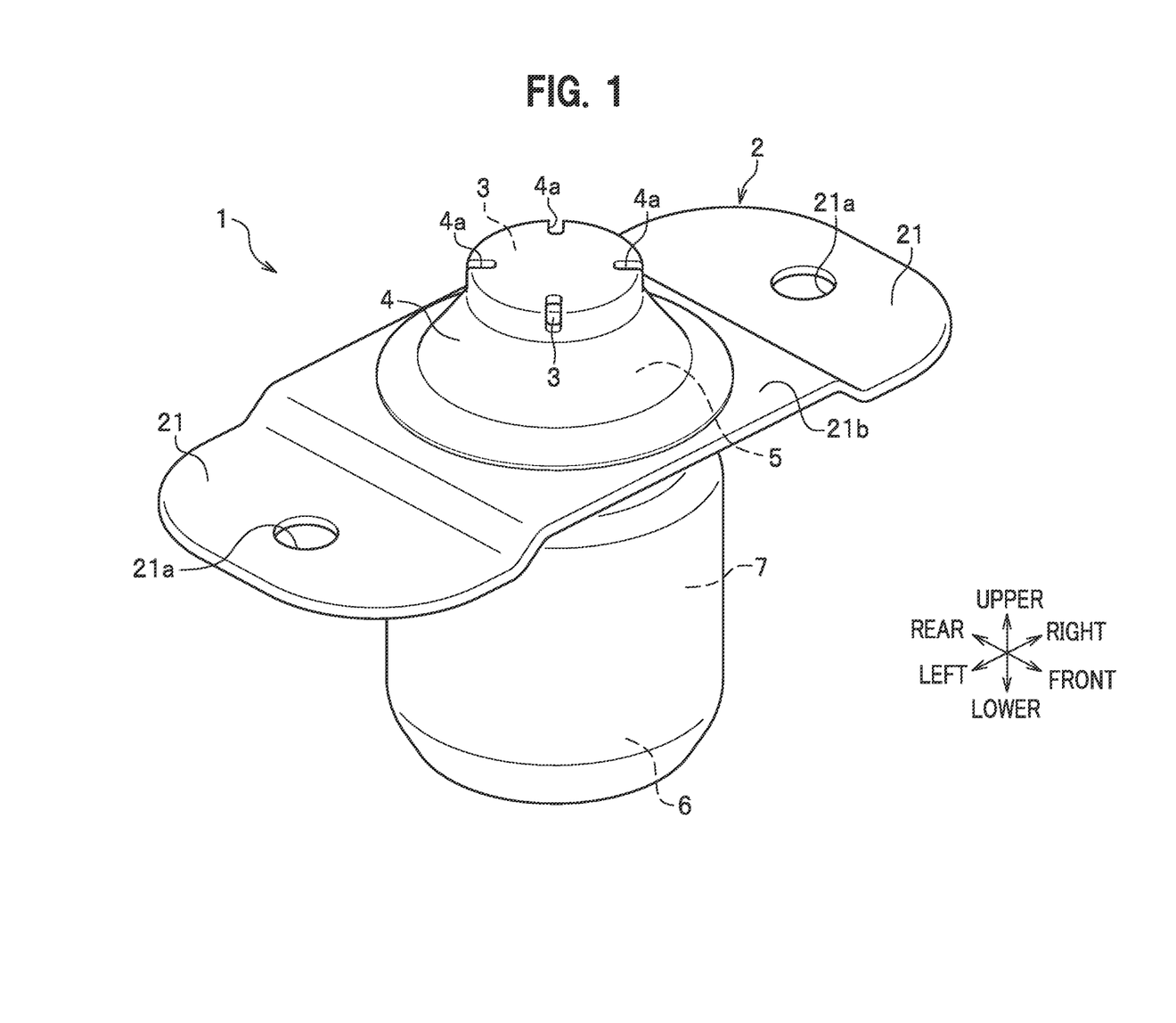
FIG. 1 is a perspective view of a liquid sealed damper for an opening and closing member according to one embodiment of the present invention.
Figure 2:
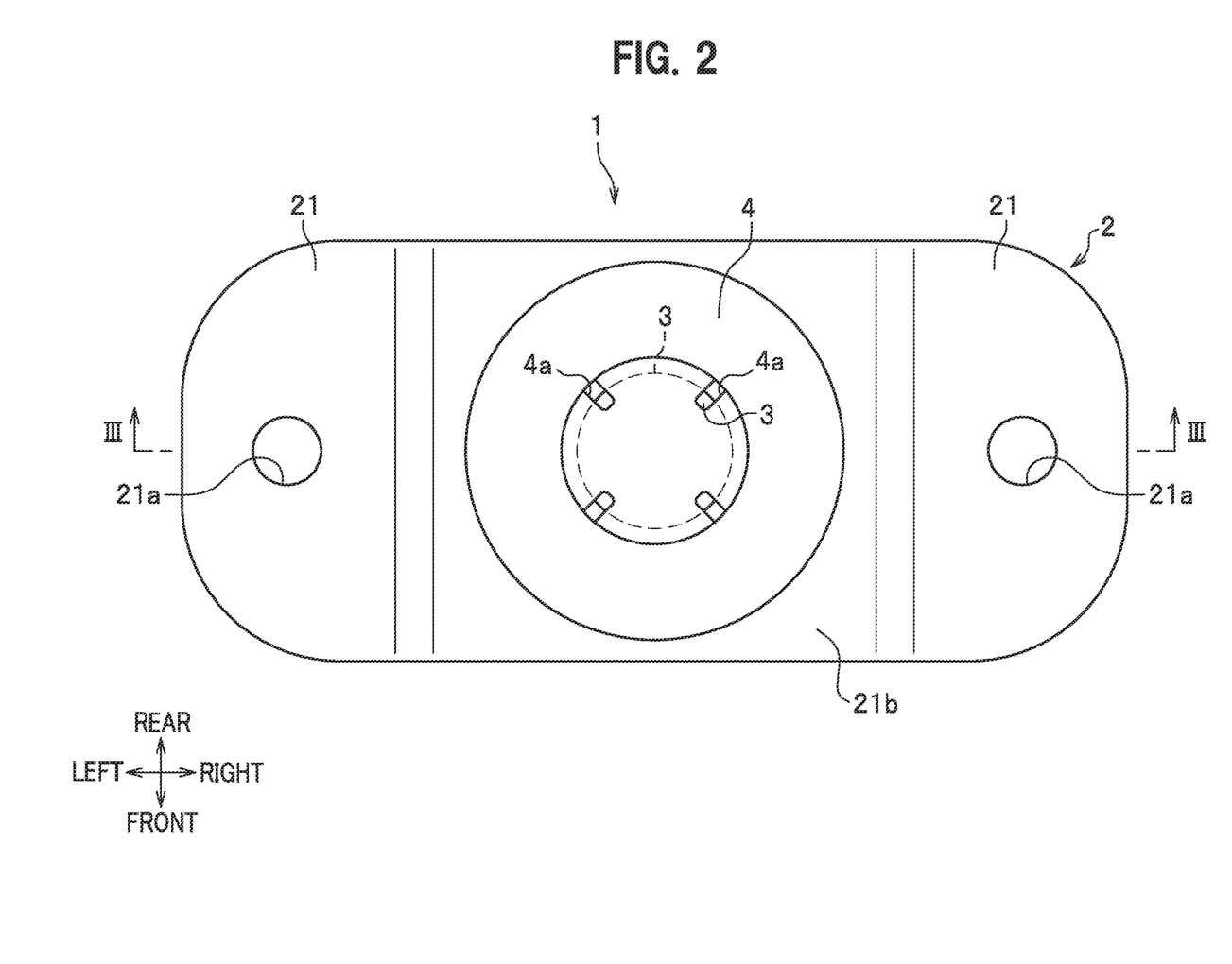
FIG. 2 is a plan view of the liquid sealed damper.

As seen in FIGS. 1 and 2, a liquid sealed damper 1 for an opening and closing member according to this embodiment includes an attachment portion 2, a contact portion 3, and an insulator 4. Further, as seen in FIG. 3, the liquid sealed damper 1 includes a main liquid chamber 5, an auxiliary liquid chamber 6, a partition member 7, an orifice passage 8, and a diaphragm 9.

The attachment portion 2 is a portion to be attached to a tail gate for closing a rear opening of a rear luggage space (not shown). An upper surface of the attachment portion 2 faces a front side of a vehicle when the attachment portion 2 is attached to the tail gate of the vehicle. As seen in FIGS. 1 and 2, the attachment portion 2 has a pair of flange portions 21, 21 extending in right-left directions. Each flange portion 21 has a bolt hole 21a for fixing the liquid sealed damper 1. Provided at a central portion of the attachment portion 2 is a protruding portion 21b that is formed one step higher than the flange portions 21, 21 and thus protrudes toward the insulator 4. An upper surface of the protruding portion 21b is flat, and a lower end portion of a foot portion 4d of the insulator 4 is bonded to the protruding portion 21b. In other words, the attachment portion 2 includes the protruding portion 21b serving as a base on which the insulator 4 is mounted, and the flange portions 21, 21 laterally jutting out from a position that is one step lower than the upper surface of the protruding portion 21b. The foot portion 4d is relatively thick in its entire thickness (so that the distance between an inner surface and an outer surface of the insulator 4 is increased). This makes it possible to improve the durability of the insulator 4.

Figure 3:
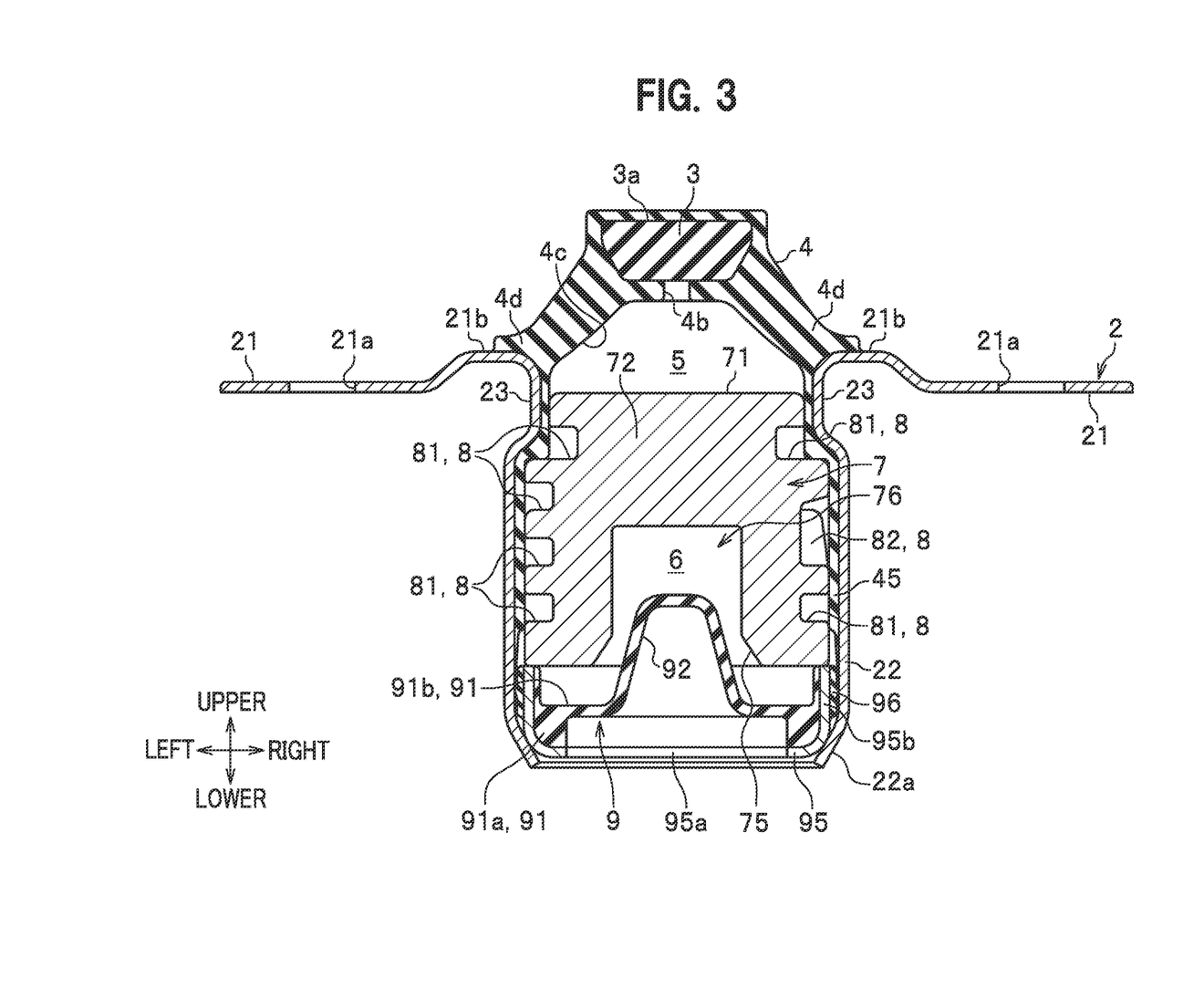
FIG. 3 is a sectional view taken along the line III-III of FIG. 2.

As seen in FIG. 3, the attachment portion 2 is provided at a lower central portion thereof with an outer cylindrical portion 22 having a circular cylindrical shape. The outer cylindrical portion 22 is integrally formed with the flange portions 21, 21 and the protruding portion 21b. The outer cylindrical portion 22 is a member for entirely surrounding the partition member 7. The outer cylindrical portion 22 serves as a casing for the liquid sealed damper 1. An extension portion 45 of the insulator 4 is integral with an inner surface of the outer cylindrical portion 22. The extension portion 45 extends downward from the entire periphery of the foot portion 4d of the insulator 4. The extension portion 45 surrounds an outer peripheral surface of the partition member 7 and covers an inner peripheral surface of the outer cylindrical portion 22. The extension portion 45 is formed when the insulator 4 is fixed to the attachment portion 2.

A restricted portion 23 is formed at an upper end portion (that is one end portion) of the outer cylindrical portion 22. The restricted portion 23 is formed by reducing the diameter of the outer cylindrical portion 22 in a radially inward direction of the outer cylindrical portion 22. An upper end portion 72 of the partition member 7 is held inside the restricted portion 23.

The contact portion 3 is integral with an upper portion of the insulator 4. As seen in FIG. 3, the contact portion 3 is substantially entirely embedded in the insulator 4, and is vulcanized and bonded to the insulator 4. The contact portion 3 is formed, for example, of hard rubber.

The contact portion 3 has an inverted trapezoidal cross-section, and an upper surface of the contact portion 3 is a flat seating surface 3a. The contact portion 3 is configured such that an external force generated when the tail gate is closed is input through the insulator 4 in the direction normal to the seating surface 3a.

Figure 4:
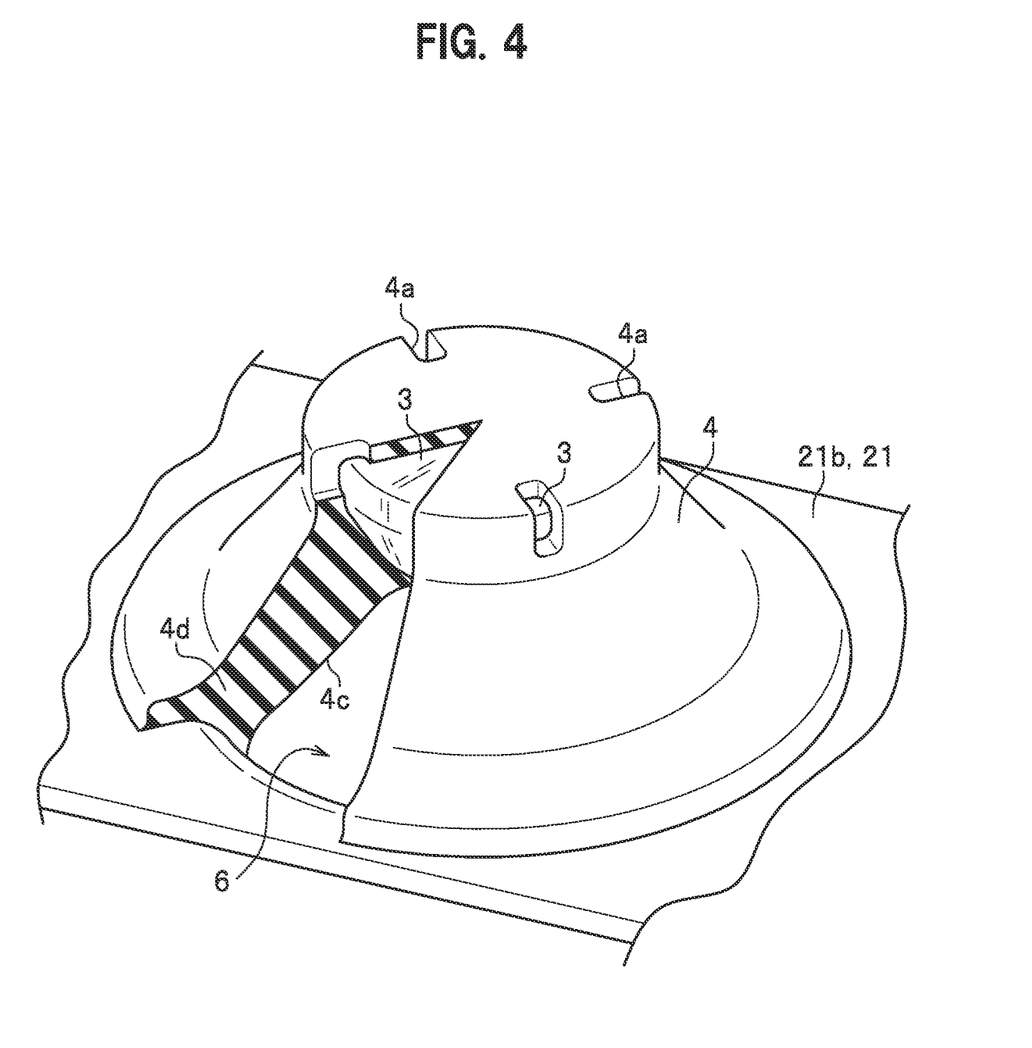
FIG. 4 is a perspective view, partly in section, of an upper side of the liquid sealed damper.

The contact portion 3 is retained from upper and lower sides by a jig (not shown) located at an upper side and a jig (not shown) located at a lower side, and is fixed to a predetermined position of the insulator 4 when the contact portion 3 is vulcanized. As seen in FIGS. 1, 2 and 4, four slits 4a are formed in an upper peripheral edge portion of the insulator 4. The slits 4a are a trace of claw portions (not shown) of the upper jig. The claw portions serve to receive the contact portion 3 during vulcanization. The seating surface 3a of the contact portion 3 is partly exposed to view from the slits 4a.

On the other hand, as seen in FIG. 3, a holding hole 4b is formed in the insulator 4 at a lower side of the contact portion 3. The holding hole 4b is a trace of a circular cylindrical holding portion of the lower jig. A lower surface of the contact portion 3 is partly exposed to view from the holding hole 4b.

The contact portion 3 is embedded in the insulator 4, so that working liquid flows easily. This is because a large amount of working liquid is pushed down because the contact portion 3 is embedded in the insulator 4. The liquid sealing performance is improved by increasing the depressed working liquid.

The insulator 4 is an elastic member configured to isolate vibration and to connect the attachment portion 2 and the contact portion 3. The insulator 4 is made, for example, of a boron nitride material, which excels in wear and abrasion resistance. The insulator 4 has a substantially frusto-conical shape, and includes a recess portion 4c that defines a wall portion of the main liquid chamber 5. The recess portion 4c opens toward the partition member 7, and is partitioned by the partition member 7 to form a space serving as the main liquid chamber 5. Incompressible working liquid is sealed in the main liquid chamber 5. The hoot portion 4d of the insulator 4 is fixed to the protruding portion 21b of the attachment portion 2.

The main liquid chamber 5 is divided from the auxiliary liquid chamber 6 by the partition member 7. The auxiliary liquid chamber 6 is disposed axially downward of the main liquid chamber 5. The main liquid chamber 5 is in communication with the auxiliary liquid chamber 6 through the orifice passage 8 formed on the outer peripheral surface of the partition member 7.

As seen in FIGS. 5 to 8, the partition member 7 has a substantially circular cylindrical shape. An upper end portion 72 of the partition member 7 is smaller in diameter than other portions of the partition member 7. The orifice passage 8 is a continuous groove extending in the circumferential direction of the partition member 7 and having a recess shaped cross-section. The orifice passage 8 is formed on the outer peripheral surface of the partition member 7. The orifice passage 8 makes a plurality of complete turns from an upper end side toward a lower end side of the partition member 7 in the axial direction of the partition member 7. The orifice passage 8 is also provided on the upper end portion 72 of the partition member 7.

The orifice passage 8 includes horizontal portions 81 extending circumferentially along a flat reference surface (not shown) orthogonal to the axis of the partition member 7, and inclined portions 82 continuously formed with the horizontal portions 81 and inclined downward relative to the horizontal portions 81. The horizontal portions 81 are formed spaced apart by a predetermined interval in the axial direction of the partition member 7. Two adjacent horizontal portions 81, 81 located in the vertical direction communicate with each other through the inclined portion 82.

The orifice passage 8 according to this embodiment makes approximately three and a half (3½) complete turns on the outer peripheral surface of the partition member 7. It should be noted that the number of complete turns of the orifice passage 8 is preferably set, for example, from two turns to six turns (2 to 6). Setting the number of complete turns of the orifice passage 8 in this range makes it possible to easily obtain a desired spring constant and a desired resonance characteristic required for isolating vibration of the tail gate.

Figure 7:
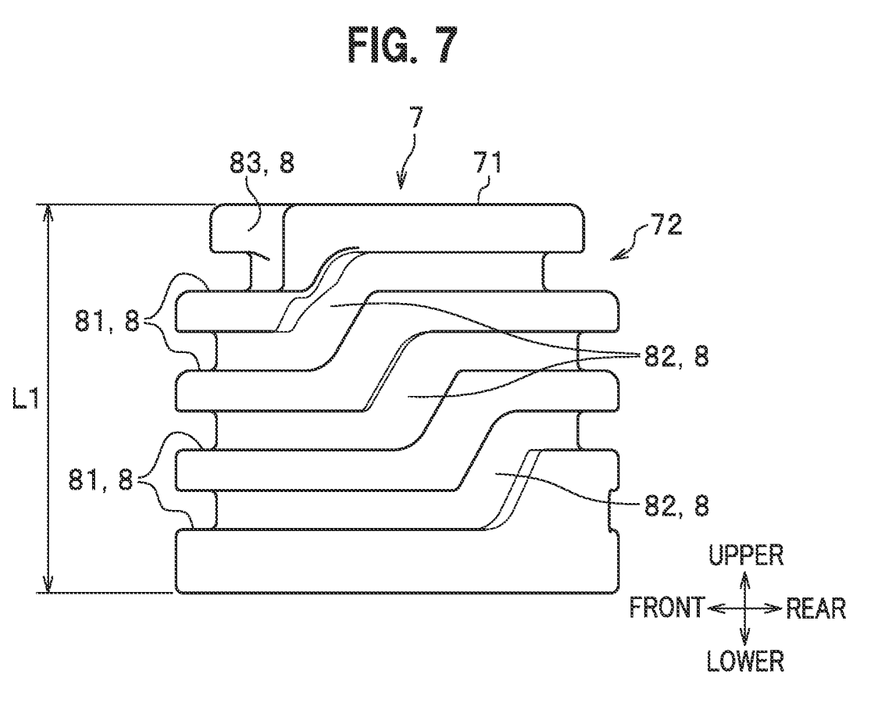
FIG. 7 is a right side view of the insulator of the liquid sealed damper.
Figure 8:
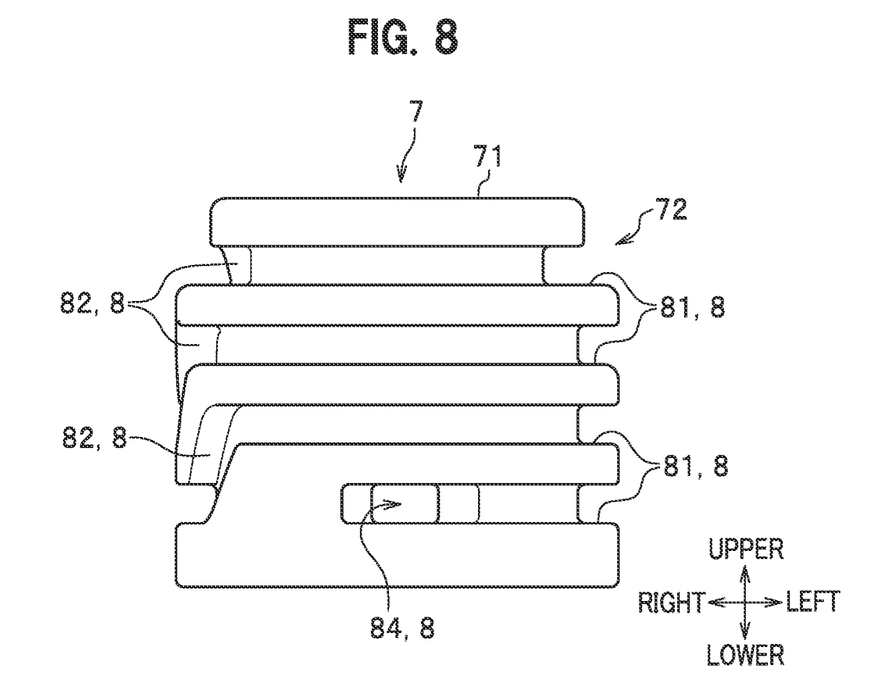
FIG. 8 is a rear view of the insulator of the liquid sealed damper.

Further, as seen in FIG. 7, the orifice passage 8 according to this embodiment is preferably configured such that the ratio of the total groove width (flow path width) of the orifice passage 8 in the axial direction of the partition member 7 versus the size L1 of the partition member 7 in the axial direction is set, for example, within the range of 14 to 47%. Setting the ratio of the total groove width of the orifice passage 8 versus the entire size of the partition member 7 in the axial direction, for example, in this range makes it possible to easily obtain a desired spring constant and a desired resonance characteristic required for isolating vibration of the tail gate.

To be more specific, the liquid sealed damper 1 according to this embodiment has a damping characteristic in a frequency band around 30 Hz that is suitable for isolating vibration of the tail gate.

The spring constant of the liquid sealed damper 1 can be reduced by enlarging the groove width of the orifice passage 8.

The cross-sectional areas of the horizontal portions 81 and the inclined portions 82 are substantially the same throughout orifice passage 8. With this configuration, a desired spring constant and a desired resonance characteristic can be obtained with ease.

The outer peripheral surface of the partition member 7 is in tightly contact with an extension portion 45 that is integrally formed with an inner peripheral surface of the outer cylindrical portion 22. The orifice passage 8 is closed by this tightly contacting extension portion 45. The upper end portion 72 of the partition member 7 is in tightly contact with the extension portion 45 inside the restricted portion 23. The orifice passage 8 formed on the upper end portion 72 of the partition member 7 is closed by this tightly contacting extension portion 45.

Figure 5:
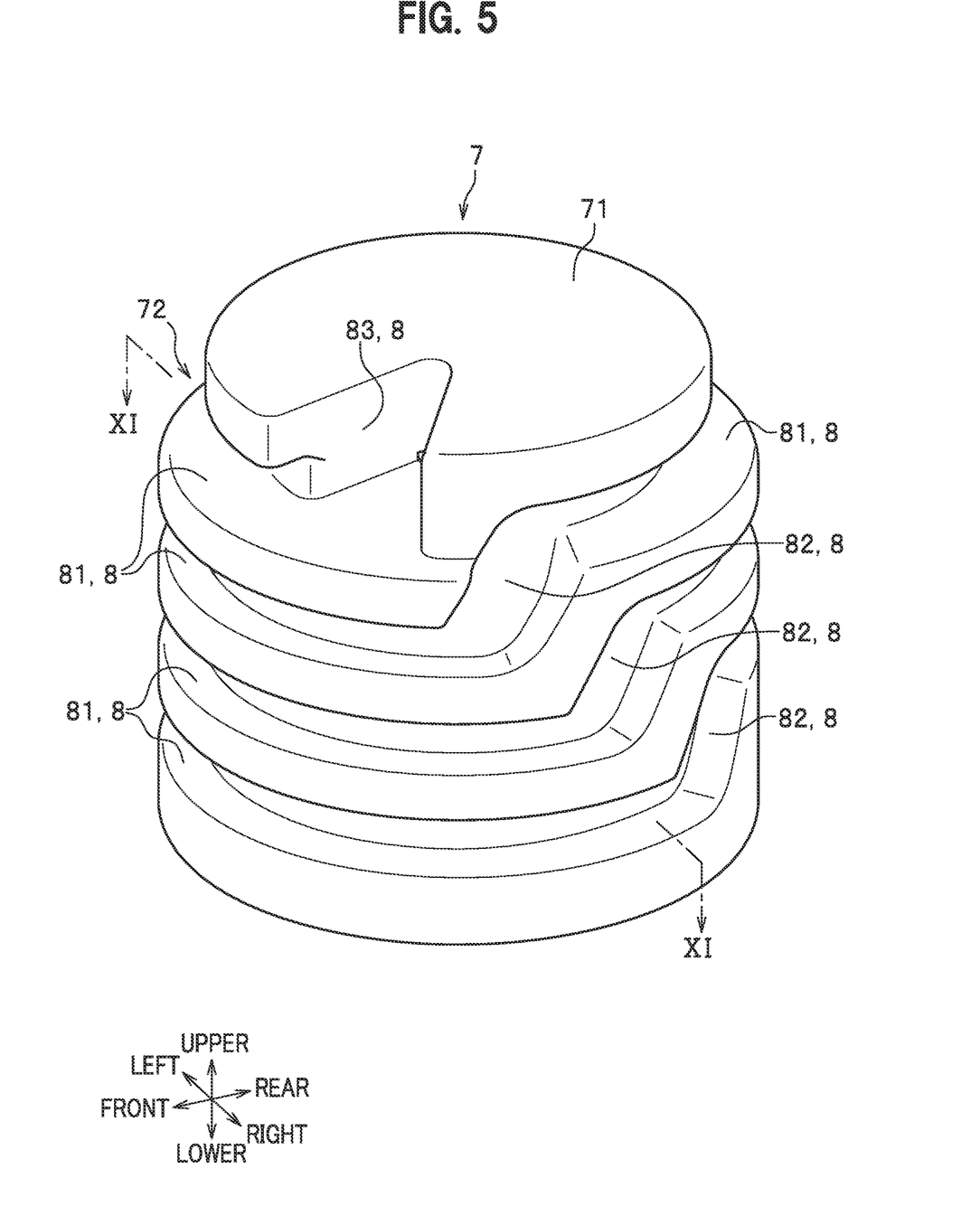
FIG. 5 is an upper right front perspective view of an insulator of the liquid sealed damper.
Figure 6:
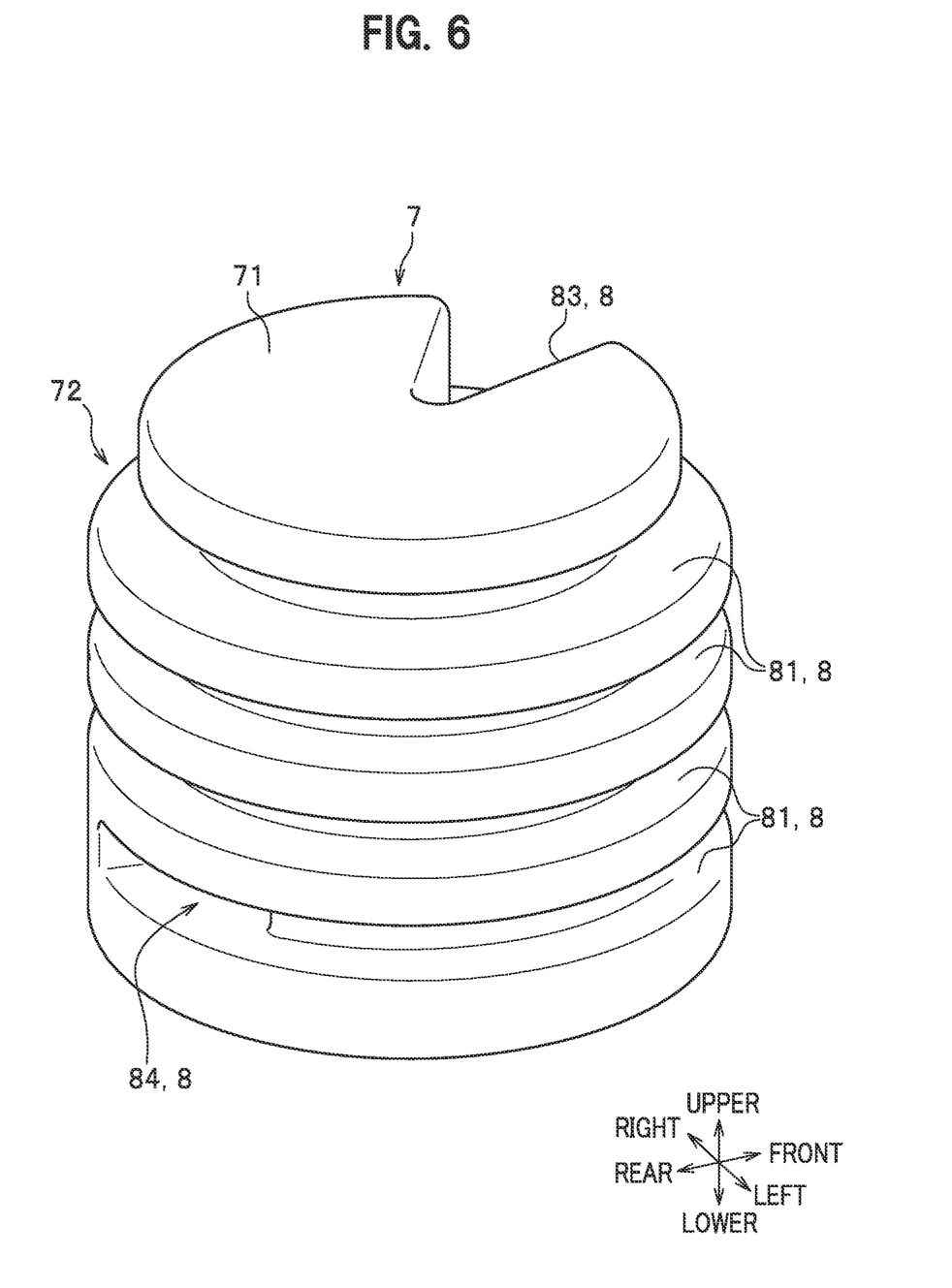
FIG. 6 is an upper left rear perspective view of the insulator of the liquid sealed damper.
Figure 9:
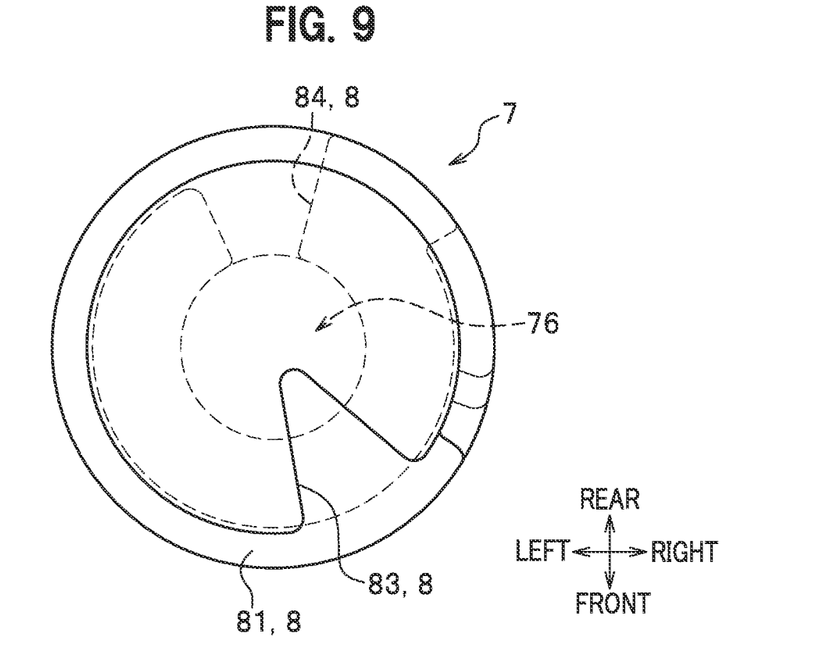
FIG. 9 is a plan view of the insulator of the liquid sealed damper.
Figure 10:
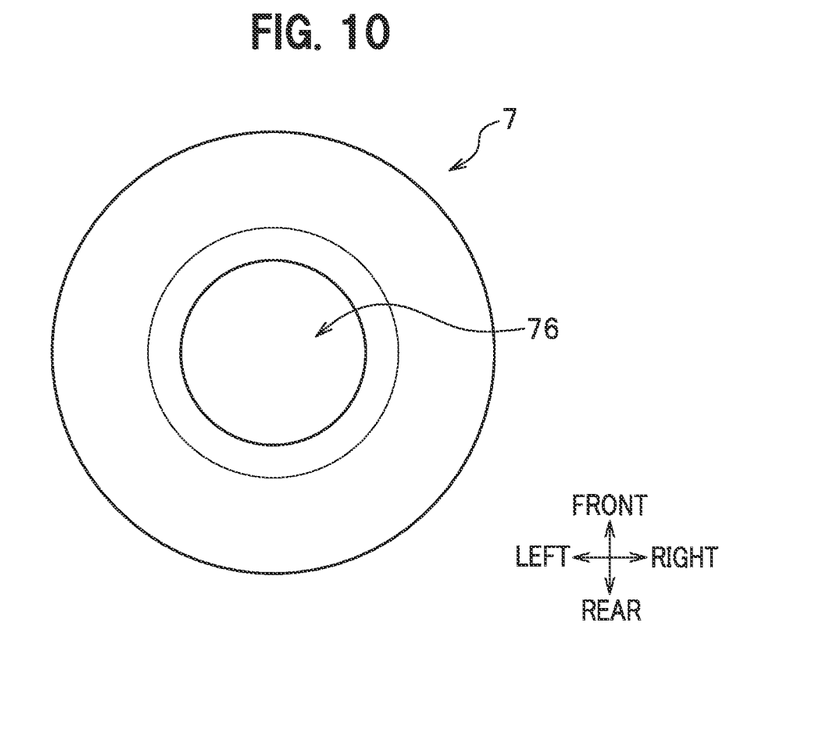
FIG. 10 is a bottom view of the insulator of the liquid sealed damper.

The partition member 7 has a substantially circular upper surface 71 that forms a wall portion of the main liquid chamber 5. An opening portion 83 in communication with one end of the orifice passage 8 is formed in the upper surface 71. As seen in FIGS. 5 and 9, the opening portion 83 is formed to extend horizontally from an outer edge portion to a central portion of the upper surface 71, and has a substantially triangular shape when viewed in plan view with the central portion of the circular upper surface 71 as a vertex. In other words, the upper portion of the partition member 7 has a V-shaped cutout formed by cutting the circular plate from the outer edge to the center thereof. The horizontal portion 81 of the orifice passage 8 that is formed on the upper end portion 72 of the partition member 7 is in communication with the opening portion 83.

Figure 11:
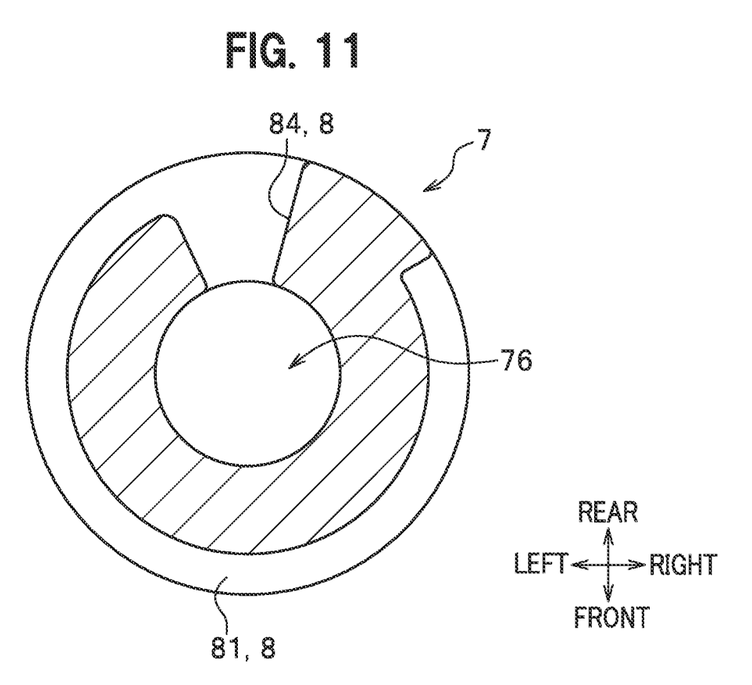
FIG. 11 is a sectional view of the liquid sealed damper taken along the line XI-XI of FIG. 5.

An inner gap 76 in the shape of a recess is formed in a bottom inner portion of the partition member 7. The inner gap 76 forms a portion of the auxiliary liquid chamber 6. As seen in FIG. 11, an opening portion 84 in communication with the other end of the orifice passage 8 is formed in the inner gap 76. The opening portion 84 at the other end of the orifice passage 8 is formed to extend from an outer edge portion of the partition member 7 to an inner surface of the inner gap 76, and has a substantially triangular shape when viewed in plan view with the inner gap 76 side as a vertex. In other words, the lower portion of the partition member 7 has a V-shaped cutout formed by cutting the circular plate from the outer edge to the center thereof.

As seen in FIG. 3, an open edge portion 75 of the inner gap 76 is chamfered in a tapered shape.

The diaphragm 9 is attached to the lower side of the partition member 7 through a support member 95 having a recess shaped cross-section. The diaphragm 9 is made, for example, of natural rubber. The diaphragm 9 has a substantially hat shaped cross-section, and includes a peripheral wall portion 91 and a rising portion 92 rising from a central portion of the peripheral wall portion 91.

The peripheral wall portion 91 includes an annular-shaped stationary portion 91a formed to have a thickness greater than those of other portions and fixed to an inner surface of the support member 95, and an extension portion 91b extending from the stationary portion 91a toward the rising portion 92. The extension portion 91b extends radially inward from a vertically central portion of the stationary portion 91a, at a position offset from a bottom opening portion 95a of the support member 95 toward the partition member 7. Accordingly, the rising portion 92 also rises upward from a position offset from the bottom opening portion 95a of the support member 95 toward the partition member 7.

The rising portion 92 has a substantially trapezoidal cross-section. An upper portion of the rising portion 92 is inserted into the inner gap 76 through an opening of the inner gap 76. A predetermined gap is formed between an outer surface of the rising portion 92 and the inner surface of the inner gap 76. With this configuration, the diaphragm 9 is less likely to contact the inner surface of the inner gap 76. Although not shown in the drawings, the rising portion 92 is positioned radially inward of the lower opening portion 84 that opens toward the inner gap 76.

Atmospheric pressure acts on the diaphragm 9 through the bottom opening portion 95a of the support member 95.

As seen in FIG. 3, the support member 95 includes a side wall portion 95b. An upper end portion of the side wall portion 95b is brought into contact with a lower end surface of the partition member 7 and an outer peripheral surface of the side wall portion 95b is brought into contact with a lower inner surface of the outer cylindrical portion 22 through an elastic member 96, so that the support member 95 is held inside the outer cylindrical portion 22. Further, a lower end portion 22a of the outer cylindrical portion 22 is drawn inward in the radial direction of the outer cylindrical portion 22 to prevent the support member 95 from falling out downward.

According to the liquid sealed damper 1 for an opening and closing member configured as described above, when the tail gate is closed, the contact portion 3 contacts through the insulator 4 an opposite portion of the rear opening of the vehicle (i.e., a peripheral portion of the rear opening that is opposite to the contact portion 3 and from which an external force is input to the contact portion 3 when the tail gate is closed), so that vibration is input. The input vibration is first absorbed by the elastic deformation of the insulator 4. According to this embodiment, since the foot portion of the insulator 4 is formed to have a greater thickness, it is possible to improve the spring characteristic and the durability against the input vibration.

If a large vibration is input, the elastic deformation of the insulator 4 is increased and the volume of the main liquid chamber 5 changes, so that the hydraulic pressure of the working liquid changes in the main liquid chamber 5. This allows the working fluid to flow into the orifice passage 8 through the opening portion 83 formed in the upper surface 71 of the partition member 7. As a result, liquid-column resonance is generated in the orifice passage 8, and vibration is damped.

The liquid sealed damper 1 for an opening and closing member as described above in this embodiment is configured such that the opening portion 83 of the orifice passage 8 that faces the main liquid chamber 5 is formed to extend from the outer edge portion to the central portion of the upper surface 71 of the partition member 7, so that the size of the liquid sealed damper 1 can be reduced while ensuring an adequate size of the opening portion 83 of the orifice passage 8.

According to this embodiment, since the orifice passage 8 is a groove formed on the outer peripheral surface of the partition member 7 and having a recess shaped cross-section, which groove makes a plurality of complete turns from the upper end toward the lower end of the partition member 7 in the axial direction of the partition member 7, the orifice passage 8 is exposed to view from the outer peripheral surface of the partition member 7 and thus can be formed with ease. Further, after the partition member 7 is formed using a metal mold, the metal mold can be easily removed. Accordingly, the partition member 7 is excellent in productivity.

Further, since the total length of the orifice passage 8 can be made longer, it is possible to reduce the frequency of a vibration to be damped.

Further, since the height of the flow path (flow path width) of the orifice passage 8 can be made constant, it is possible to reduce the resistance when the working liquid flows through the orifice passage 8 (resistance generated between the flow path wall surface and the working liquid).

According to this embodiment, since the cross-sectional area of the orifice passage 8 is substantially the same throughout the orifice passage 8, it is possible to reduce the resistance when the working liquid flows through the orifice passage 8 (resistance generated between the flow path wall surface and the working liquid).

According to this embodiment, since the upper portion of the partition member 7 is smaller in diameter than other portions of the partition member 7, the liquid sealed damper 1 can be downsized accordingly.

Further, since the orifice passage 8 is formed on the upper portion of the partition member 7 having a smaller diameter, it is possible to increase the total length of the orifice passage 8 while reducing the size of the liquid sealed damper 1. This makes it possible to improve the damping performance.

According to this embodiment, since the upper portion of the partition member 7 having a smaller diameter is held by the restricted portion 23 formed in the outer cylindrical portion 22, it is possible to enhance the retaining property of the partition member 7 relative to the outer cylindrical portion 22.

According to this embodiment, since the attachment portion 2 has the protruding portion 21b to which the foot portion 4d of the insulator 4 is fixed, the adhesion of the foot portion 4d can be enhanced as compared with an alternative configuration in which the foot portion 4d of the insulator 4 is fixed to a flat surface. This can improve the water sealing performance as well as the durability of the insulator 4 and thus the durability of the liquid sealed damper 1 as a whole.

According to this embodiment, since the insulator 4 is made of a boron nitride material, the abrasion resistance and the durability of the liquid sealed damper 1 can be improved.

According to this embodiment, the partition member 7 is fitted into the inner peripheral surface of the outer cylindrical portion 22, so that the extension portion (elastic member) 45 is brought into tight contact with the outer peripheral surface of the partition member 7 to form the orifice passage 8. With this configuration, the orifice passage 8 can be formed easily without using a dedicated means.

Further, according to this embodiment, since the contact portion 3 is embedded in the insulator 4, the contact portion 3 is prevented from coming off and thus can preserve the function thereof over an extended period of time. Further, since a large amount of working liquid is pushed down because of the contact portion 3 embedded in the insulator 4, the working liquid flows easily. This can improve the liquid sealing performance.

According to this embodiment, since the insulator 4 is molded while the contact portion 3 is retained from both sides in the axial direction of the insulator 4, the contact portion 3 is prevented from moving in the insulator 4 or coming off the insulator 4 when the insulator 4 is molded. Accordingly, the insulator 4 is excellent in productivity.

According to this embodiment, since a part of the diaphragm 9 is inserted into the recess shaped inner gap 76 of the partition member 7, the size of the liquid sealed damper 1 can be reduced while ensuring an adequate volume of the auxiliary liquid chamber 6.

According to this embodiment, since the opening portion 84 in communication with the orifice passage 8 is formed in the inner gap 76 of the partition member, the working liquid flows smoothly into the auxiliary liquid chamber 6. Accordingly, the liquid sealed damper 1 with an excellent damping characteristic can be obtained.

According to this embodiment, since the open edge portion 75 of the inner gap 76 is chamfered in a tapered shape, the rising portion 92 of the diaphragm 9 is less likely to contact the open edge portion 75 and the abrasion resistance of the diaphragm 9 can be improved.

According to this embodiment, the diaphragm 9 has a hat shaped cross-section and includes the peripheral wall portion 91 extending from the axially central portion of the annular-shaped stationary portion 91a toward the rising portion 92. Further, to improve the durability of the diaphragm 9 as well as to reduce the size of the tail gate damper 1, the diaphragm 9 is disposed inside the auxiliary liquid chamber 6. This makes it possible to extend the membrane surface of the diaphragm 9 to improve the durability of the diaphragm.

According to this embodiment, the orifice passage 8 includes the horizontal portions 81 extending in the circumferential direction of the partition member 7, and the inclined portions 82 inclined downward relative to the horizontal portions 81. With this configuration, the orifice passage 8 can be formed on the outer peripheral surface of the partition member 7 in a space-efficient manner. Accordingly, a desired spring constant and a desired resonance characteristic required for isolating vibration of the tail gate can be obtained with ease.

Although one embodiment of the present invention has been described above, the present invention is not limited to the above-described embodiment and various changes and modifications may be made, where appropriate, without departing from the scope of the present invention.

In the above-described embodiment, the attachment portion 2 is attached to the tail gate, and the contact portion 3 receives an external force from the opposite portion of the rear opening of the vehicle. However, the attachment portion 2 may be attached to a peripheral portion of the rear opening, and the contact portion 3 may receive an external force from the tail gate.

Figure 12:
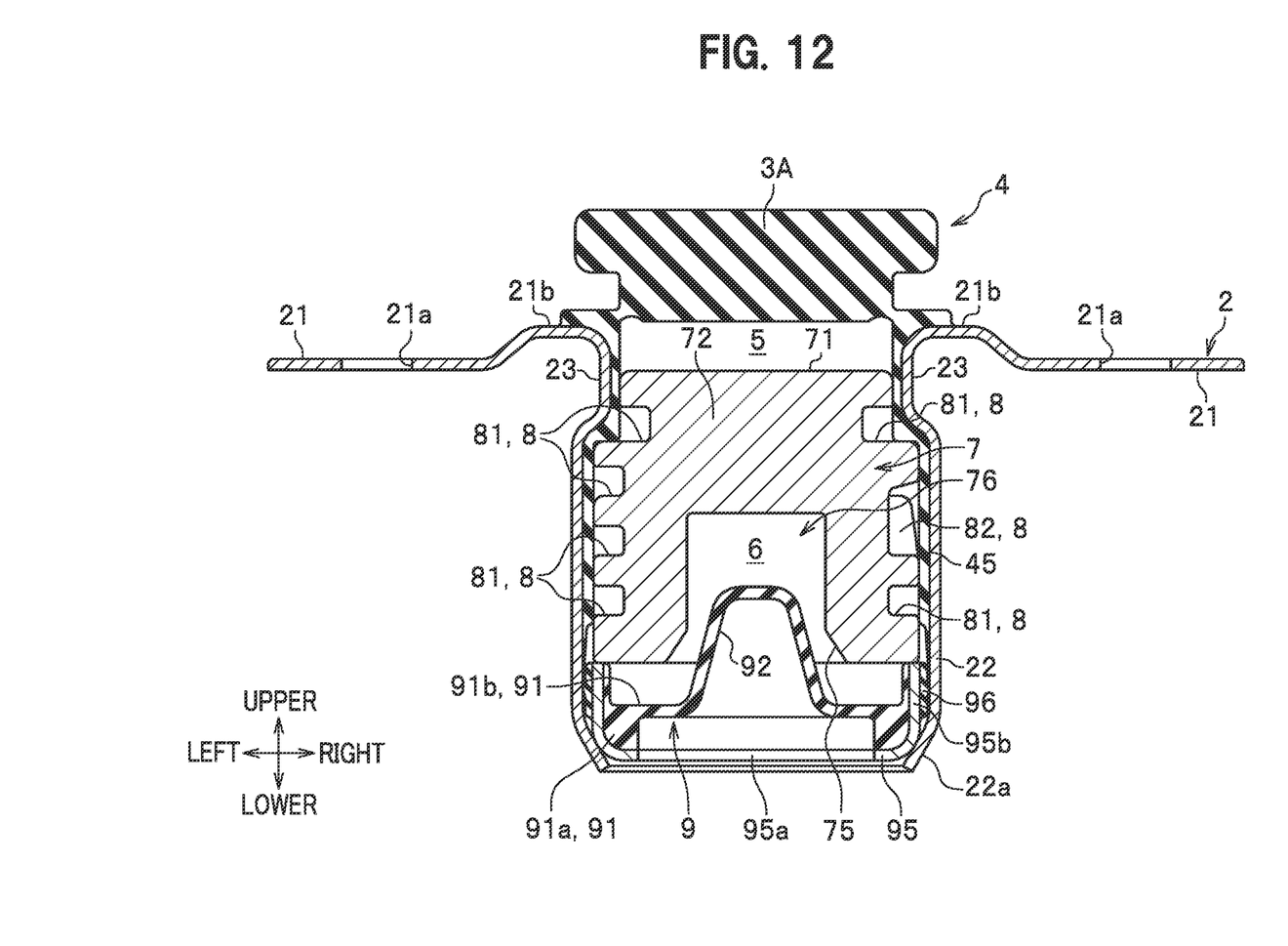
FIG. 12 is a sectional view similar to FIG. 3 showing the liquid sealed damper according to a modified embodiment of the present invention.

For example, as seen in FIG. 12, the contact portion 3A may not be embedded in the insulator 4, and an external force generated when the tail gate is closed may be directly input to the contact portion 3A. With this configuration, unlike the above-described embodiment, it is not necessary to embed a member serving as the contact portion in the insulator 4, thereby leading to cost reduction and an improvement in the productivity.

Although the partition member 7 is in the shape of a circular cylinder in the above-described embodiment, the partition member 7 may have an oval horizontal cross-section. Such a configuration can also provide the operational effects same as those described in the above-described embodiment. In this modified embodiment, the contact portion may be formed to have an oval horizontal cross-section.

Further, the orifice passage 8 is formed by a groove having a recess shaped cross-section in the above-described embodiment. However, the orifice passage 8 is not limited to this specific configuration. For example, the orifice passage 8 may have various cross-sections, such as a curved cross-section, a semi-circular cross-section, a triangular cross-section, and a polygonal cross-section. Further, instead of the orifice passage 8 including the horizontal portions 81 and the inclined portions 82 alternately connected to each other, the orifice passage 81 may be mainly formed of inclined portions such that the orifice passage 8 makes a plurality of spiral complete turns.

Further, in the above-described embodiment, the opening portions 83, 84 of the orifice passage 8 are a substantially triangular shape when viewed in plan view. However, the opening portions 83, 84 are not limited to this specific shape, and may have various shapes as long as a large opening area is formed in the cross-sectional direction where the opening portion extends.

What is claimed is:

1. A liquid sealed damper for an opening and closing member comprising:
    an attachment portion attached to one of a peripheral portion of an opening of a vehicle and an opening and closing member for covering the opening;
    a contact portion to which an external force is input from the other one of the peripheral portion of the opening and the opening and closing member;
    an insulator configured to isolate vibration and to connect the attachment portion and the contact portion;
    a main liquid chamber in which working liquid is sealed, the insulator serving as a wall portion of the main liquid chamber;
    an auxiliary liquid chamber divided from the main liquid chamber by a partition member, the auxiliary liquid chamber having a wall portion formed of a diaphragm; and
    an orifice passage formed in the partition member and communicating with the main liquid chamber and with the auxiliary liquid chamber,
    wherein the partition member has a substantially circular surface that forms a wall portion of the main liquid chamber,
    wherein an opening portion at one end of the orifice passage is formed in the circular surface,
    wherein the opening portion is formed to extend from an outer edge portion to a central portion of the circular surface,
    wherein the partition member has one end portion disposed closer to the main liquid chamber, and the one end portion is smaller in diameter than other portions of the partition member, and
    wherein an outer peripheral surface of the one end portion of the partition member has a groove having a recess shaped cross-section to define the orifice passage.

2. The liquid sealed damper according to claim 1,
    wherein the partition member has a substantially circular cylindrical shape,
    wherein the groove makes a plurality of complete turns from the one end portion toward an opposite end portion of the partition member in an axial direction thereof,
    wherein a ratio of a total groove width of the orifice passage in the axial direction of the partition member versus a size of the partition member in the axial direction is within the range of 14 to 47%.

3. The liquid sealed damper according to claim 1, wherein a cross-sectional area of the orifice passage is substantially the same throughout the orifice passage.

4. The liquid sealed damper according to claim 1, wherein the attachment portion has one side to which the insulator is disposed and another side opposite to the one side, and the attachment portion includes an outer cylindrical portion extending from the another side to surround the partition member, and
    wherein one end portion of the outer cylindrical portion has a restricted portion formed by reducing a diameter of the outer cylindrical portion in a radially inward direction of the outer cylindrical portion to hold one end portion of the partition member.

5. The liquid sealed damper according to claim 4, wherein an elastic member is fitted into an inner peripheral surface of the outer cylindrical portion to tightly contact with an outer peripheral surface of the partition member, and
    wherein the elastic member forms a wall portion of the orifice passage.

6. The liquid sealed damper according to claim 1, wherein the insulator is made of a boron nitride material.

7. The liquid sealed damper according to claim 1, wherein the contact portion is embedded in the insulator.

8. The liquid sealed damper according to claim 1, wherein the insulator is molded while the contact portion is retained from both sides in an axial direction of the insulator.

9. The liquid sealed damper according to claim 1, wherein the partition member has an inner gap in the shape of a recess, and
    wherein an opening portion in communication with the orifice passage is formed in an inner surface of the inner gap.

10. The liquid sealed damper according to claim 9, wherein an open edge portion of the inner gap is chamfered in a tapered shape.

11. The liquid sealed damper according to claim 1, wherein the diaphragm has a peripheral wall portion and a rising portion rising from a central portion of the peripheral wall portion, and
    wherein the peripheral wall portion includes an annular-shaped stationary portion formed to have a thickness greater than those of other portions, and an extension portion extending from one axial end portion of the stationary portion that is closer to the partition member toward the rising portion.

12. A liquid sealed damper for an opening and closing member comprising:
- an attachment portion attached to one of a peripheral portion of an opening of a vehicle and an opening and closing member for covering the opening;
- a contact portion to which an external force is input from the other one of the peripheral portion of the opening and the opening and closing member;
- an insulator configured to isolate vibration and to connect the attachment portion and the contact portion;
- a main liquid chamber in which working liquid is sealed, the insulator serving as a wall portion of the main liquid chamber;
- an auxiliary liquid chamber divided from the main liquid chamber by a partition member, the auxiliary liquid chamber having a wall portion formed of a diaphragm; and
- an orifice passage formed in the partition member and communicating with the main liquid chamber and with the auxiliary liquid chamber,
- wherein the partition member has a substantially circular surface that forms a wall portion of the main liquid chamber,
- wherein an opening portion at one end of the orifice passage is formed in the circular surface,
- wherein the opening portion is formed to extend from an outer edge portion to a central portion of the circular surface,
- wherein the attachment portion has a protruding portion formed to protrude toward the insulator, and
- wherein the insulator is connected to the protruding portion.

13. The liquid sealed damper according to claim 12, wherein the insulator is made of a boron nitride material.

14. The liquid sealed damper according to claim 12, wherein the contact portion is embedded in the insulator.

15. The liquid sealed damper according to claim 12, wherein the insulator is molded while the contact portion is retained from both sides in an axial direction of the insulator.

16. A liquid sealed damper for an opening and closing member comprising:
- an attachment portion attached to one of a peripheral portion of an opening of a vehicle and an opening and closing member for covering the opening;
- a contact portion to which an external force is input from the other one of the peripheral portion of the opening and the opening and closing member;
- an insulator configured to isolate vibration and to connect the attachment portion and the contact portion;
- a main liquid chamber in which working liquid is sealed, the insulator serving as a wall portion of the main liquid chamber;
- an auxiliary liquid chamber divided from the main liquid chamber by a partition member, the auxiliary liquid chamber having a wall portion formed of a diaphragm; and
- an orifice passage formed in the partition member and communicating with the main liquid chamber and with the auxiliary liquid chamber,
- wherein the partition member has a substantially circular surface that forms a wall portion of the main liquid chamber,
- wherein an opening portion at one end of the orifice passage is formed in the circular surface,
- wherein the opening portion is formed to extend from an outer edge portion to a central portion of the circular surface,
- wherein the partition member has a substantially circular cylindrical shape, and
- wherein the orifice passage includes a horizontal portion extending circumferentially along a flat reference surface orthogonal to an axis of the partition member, and an inclined portion continuously formed with the horizontal portion and inclined relative to the horizontal portion.

17. The liquid sealed damper according to claim 16, wherein the insulator is made of a boron nitride material.

18. The liquid sealed damper according to claim 16, wherein the contact portion is embedded in the insulator.

19. The liquid sealed damper according to claim 16, wherein the insulator is molded while the contact portion is retained from both sides in an axial direction of the insulator.

\* \* \* \* \*